United States Patent
Floyd et al.

(10) Patent No.: US 7,085,265 B2
(45) Date of Patent: Aug. 1, 2006

(54) MAPPING BETWEEN TDM CHANNELS AND PACKETS

(75) Inventors: Geoffrey Edward Floyd, Yelverton (GB); Timothy Michael Edmund Frost, Plymouth (GB); James F. Kosolowski, Woodlawn (CA); Martin Raymond Scott, Cornwall (GB)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 987 days.

(21) Appl. No.: 10/152,365

(22) Filed: May 21, 2002

(65) Prior Publication Data

US 2003/0031199 A1 Feb. 13, 2003

(30) Foreign Application Priority Data

Aug. 11, 2001 (GB) ................... 0119617.9

(51) Int. Cl.
*H04J 3/16* (2006.01)
*H04L 12/66* (2006.01)
(52) U.S. Cl. ...................................... 370/356; 370/466
(58) Field of Classification Search ..................... None
See application file for complete search history.

(56) References Cited

U.S. PATENT DOCUMENTS

| 4,612,636 | A | * | 9/1986 | Grover et al. | ............... 370/466 |
| 6,219,350 | B1 | * | 4/2001 | Lee | ........................ 370/395.61 |
| 6,763,025 | B1 | * | 7/2004 | Leatherbury et al. | .. 370/395.64 |

FOREIGN PATENT DOCUMENTS

EP          0722237          7/1996

* cited by examiner

*Primary Examiner*—Chau Nguyen
*Assistant Examiner*—Jordan Hamann
(74) *Attorney, Agent, or Firm*—Thompson Hine LLP

(57) ABSTRACT

A method of mapping between contexts of a packet network and TDM channels and streams. The method comprises constructing a lookup table defining the sequence in which data is to be mapped between contexts and TDM channels and streams, and including for each row of the table a flag which indicates whether or not that entry is the first entry in the table for the corresponding context. As the TDM receive or transmit entity cycles through the lookup table, use is made of the flags to synchronize the start of each packet with the first entry of a TDM frame for each context.

3 Claims, 3 Drawing Sheets

| Channel Number | Stream Number | Context Identifier | Valid channel flag | First channel flag | |
|---|---|---|---|---|---|
| 0 | 0 | 1 | Y | Y | First channel for context 1 |
| 0 | 1 | 1 | Y | N | |
| 0 | 2 | 2 | Y | Y | First channel for context 2 |
| 0 | 3 | 1 | Y | N | |
| 1 | 0 | 1 | Y | N | |
| 1 | 1 | 2 | Y | N | |
| 1 | 2 | 2 | Y | N | |
| 1 | 3 | 1 | Y | N | |
| 2 | 0 | 2 | Y | N | |
| 2 | 1 | 2 | Y | N | |
| 2 | 2 | 3 | N | N | |
| 2 | 3 | 3 | N | N | |
| 3 | 0 | 4 | Y | Y | First channel for context 3 |
| 3 | 1 | 3 | N | N | |
| 3 | 2 | 4 | Y | N | |
| 3 | 3 | 4 | Y | N | |

| Channel Number | Stream Number | Context Identifier | Valid channel flag |
|---|---|---|---|
| 0 | 0 | 1 | Y |
| 0 | 1 | 1 | Y |
| 0 | 2 | 2 | Y |
| 0 | 3 | 1 | Y |
| 1 | 0 | 1 | Y |
| 1 | 1 | 2 | Y |
| 1 | 2 | 2 | Y |
| 1 | 3 | 1 | Y |
| 2 | 0 | 2 | Y |
| 2 | 1 | 2 | Y |
| 2 | 2 | 3 | N |
| 2 | 3 | 3 | N |
| 3 | 0 | 4 | Y |
| 3 | 1 | 3 | N |
| 3 | 2 | 4 | Y |
| 3 | 3 | 4 | Y |

Figure 3

| Channel Number | Stream Number | Context Identifier | Valid channel flag | First channel flag | |
|---|---|---|---|---|---|
| 0 | 0 | 1 | Y | Y | First channel for context 1 |
| 0 | 1 | 1 | Y | N | |
| 0 | 2 | 2 | Y | Y | First channel for context 2 |
| 0 | 3 | 1 | Y | N | |
| 1 | 0 | 1 | Y | N | |
| 1 | 1 | 2 | Y | N | |
| 1 | 2 | 2 | Y | N | |
| 1 | 3 | 1 | Y | N | |
| 2 | 0 | 2 | Y | N | |
| 2 | 1 | 2 | Y | N | |
| 2 | 2 | 3 | N | N | |
| 2 | 3 | 3 | N | N | |
| 3 | 0 | 4 | Y | Y | First channel for context 3 |
| 3 | 1 | 3 | N | N | |
| 3 | 2 | 4 | Y | N | |
| 3 | 3 | 4 | Y | N | |

Figure 4

MAPPING BETWEEN TDM CHANNELS AND PACKETS

FIELD OF THE INVENTION

The present invention relates to mapping between TDM channels and packets, such as is required in order to transmit TDM data across a packet network.

BACKGROUND TO THE INVENTION

Time division multiplexing (TDM) is a mechanism commonly used for sharing resources on a communication link. Consider for example a single "wire" connecting multiple voice or data channels between call switches of a telephone network. The link is divided in time into successive frames of equal duration. Each frame is further subdivided in time into a sequence of slots (e.g. numbered 0 to 31), where each slot can accommodate 8 bits. The number of slots in a frame is determined by the data rate of the link and the duration of the frame. Multiple channels are formed on a data stream by allocating respective slot numbers to channels. Thus, a first channel (CH0) is formed from the set of first slots in successive frames, a second channel (CH1) is formed from the set of second slots in successive frames, etc. A typical system may comprise 32 wires providing a total of 1024 data channels. A further two wires provide slot and frame synchronisation signals respectively.

Telephone network operators are keen to make use of packet networks to carry user traffic. For example, such packet networks may make use of the well known Internet Protocol (IP) to route data packets. In order to enable packet networks to interwork with conventional TDM networks, it will be necessary to provide a mechanism for efficiently converting between the TDM format and the packet format. FIG. 1 illustrates in very general terms a mechanism for facilitating the transparent flow of data between two TDM networks via a packet network. This mechanism must meet the following requirements:

Transmit constant bit rate TDM data across a packet network so that it can be reconstructed as TDM data at the far end;
Support the mapping of multiple TDM channels into a stream of packets (called a context) for transmission over a network;
Support multiple packet streams (contexts);
Maintain timeslot order when mapping TDM channels to and from context packets;
Each packet must contain one or more complete TDM frames of data; and
Packet transmission and reception must be aligned with the first TDM channel for the context after the TDM frame pulse.

FIG. 2 illustrates in more detail the TDM-packet conversion units of FIG. 1. Within a unit, a TDM receive block assembles incoming TDM data into packets. The receiver can handle several packet streams at a time, where each packet stream represents a virtual channel connection or "context" over the packet network. Each packet comprises a header containing a context identifier. Different contexts may terminate at the same or different TDM-packet conversions units (for example associated with different network operators). Due to the large number of channels and high data rate which the system must handle, the conversion units are typically implemented in hardware.

A given context may carry several TDM channels. Packets are assembled sequentially. Data is placed into a packet as the data arrives at the (input) TDM port, maintaining channel and stream order (i.e. channel 0, stream 0 comes before channel 0, stream 1, which in turn comes before channel 1, stream 0). Each packet of a context must contain channel data belonging to one or more complete TDM frames—partial frames are not permitted—and each packet must start with the beginning of a new frame.

A TDM receive block makes use of a lookup table to map stream and channel number from the TDM interface to a context number. The lookup table additionally comprises a "channel flag" indicating whether or not individual channels on a given stream are in use. By way of example, a lookup table for a small TDM environment with four streams, each with four channels, is shown in FIG. 3. Data is written to the lookup table by the host control processor, with the hardware providing the receive block cycling through the entries in the table.

A TDM-packet conversion unit may terminate contexts from several different peer TDM-packet conversion units. Packets belonging to these contexts and received over the packet network are stored in a buffer (one for each context, although the buffers may be formed logically in the same memory device) of the receiving TDM-packet conversion unit. The TDM transmit block extracts data from the front of the buffers and transmits this on the appropriate TDM channels/streams. Again, a lookup table is used by the TDM transmit block to map context data to channels/streams (NB. the mapping may be, and most probably is, different from that used at the sending entity, although the structure of the table remains the same).

With reference again to FIG. 3 and assuming now that that table shows the mapping of contexts to channels/slots for the TDM output, it will be apparent that for context 1, the TDM transmit block will know that channel 0 of stream 0 is aligned with the start of a TDM frame. As the transmit block cycles through the lookup table, it will encounter a first entry for context 1 subsequent to that context becoming valid (i.e. the channel flag being set to Y). If that first encountered entry is that for channel 0/stream 0, the transmit block will know that a byte can be extracted from the context 1 buffer and sent on channel 0/stream 0. However, if the first encountered entry is any other entry, the transmit block will know that it must ignore the entry and continue cycling through the table until the channel 0/stream 0 entry is reached.

For contexts other than context 1 however, the transmit block has no knowledge of which entry is the first entry for a context. For example, assume that context 4 becomes valid (following the updating of the lookup table by the host control processor), and that at this time the transmit block has reached the channel number 3/stream number 2 entry of the lookup table. This is associated with context 4, and the channel flag will be set. The transmit block will extract the next byte from the context 4 buffer and send this on channel number 3/stream number 2. However, this byte should have been sent on channel number 3/stream number 0. The data therefore becomes misaligned with the start of the TDM frames. This is likely to have serious consequences as a given context may carry data associated with different calls. When misalignment occurs, a party to a call may receive data intended for some other party and vice versa. This problem of data misalignment within and between TDM frames following the updating of a lookup table by the host control processor arises also at the TDM receive block.

SUMMARY OF THE INVENTION

According to a first aspect of the present invention there is provided a method of mapping between contexts of a packet network and TDM channels, the method comprising:

constructing a lookup table defining the sequence in which data is to be mapped between contexts and TDM channels and streams, and including for each row of the table a flag which indicates whether or not that entry is the first entry in the table for the corresponding context; and cycling through the lookup table and making use of said flags to synchronise the start of each packet with the first entry of a TDM frame for each context.

Embodiments of the present invention provide a mechanism for ensuring synchronisation between TDM frames and packet contexts which is implemented by the writing of data into the lookup table by the host control processor. Indeed, as the additional data, i.e. the first channel flag, is written at the same time as the rest of the table update data, little additional computational effort is required on the part of the host control processor. Moreover, the computational effort required on the part of the conversion unit to check the setting of the first channel flag is minimal. This could be achieved using only minimal additional logic. The solution provided by the present invention is both simple and elegant.

Typically, the system is a multistream system, such that contexts are mapped between streams and channels. The channel and stream numbers are typically used to address the lookup table. The TDM transmitter/receiver cycles through the table processing each channel/stream entry in turn.

According to a second aspect of the present invention there is provided apparatus for mapping between contexts of a packet network and TDM channels, the method comprising:

a memory;

first processing means for creating and maintaining a lookup table in the memory, the lookup table defining the sequence in which data is to be mapped between contexts and TDM channels, and including for each row of the table a flag which indicates whether or not data carried by a given context is to be mapped to a first allocated channel of a TDM frame or vice versa; and second processing means for cycling through the lookup table and for making use of said flags to synchronise the start of each packet with the first entry of a TDM frame for each context.

BRIEF DESCRIPTION OF THE DRAWINGS

FIG. 3 illustrates a lookup table which might be used by the TDM-packet conversion units of FIG. 1; and FIG. 4 illustrates a modified lookup table.

DETAILED DESCRIPTION OF CERTAIN EMBODIMENTS

Figure 1:
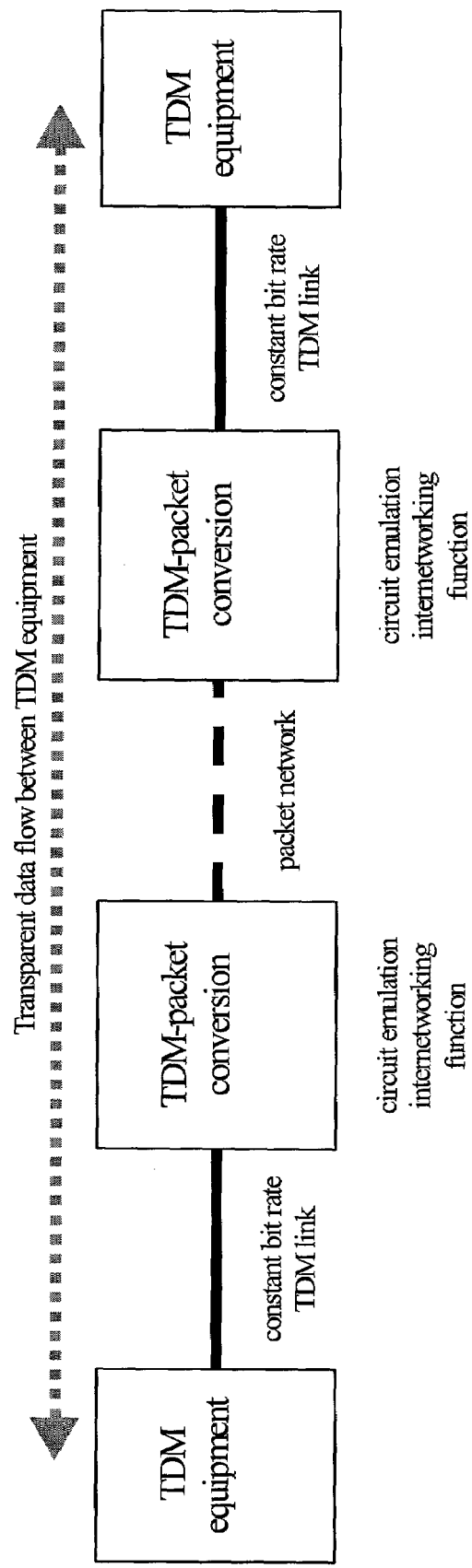
FIG. 1 illustrates schematically a system for transporting TDM data across a packet network.

A typical TDM system is able to provide 32 channels on each of 32 wires or streams, i.e. a total of 1024 channels. In order to transport the channels over a data network, channels are mapped to contexts as described above. For transmission in a given direction over the packet network, the transmitting entity maintains a first lookup table mapping channels to contexts, whilst the receiving entity maintains a second lookup table mapping contexts to channels (the channel and stream numbers are not generally held in the tables, but rather represent the indices to the tables—they are shown in the tables of FIGS. 3 and 4 merely for illustration). The lookup tables are constructed as a result of negotiations carried out over a signalling network which may make use of the packet network or may comprise a separate, dedicated signalling network. The tables can be updated dynamically, particularly to set the channel flag which indicates whether a given context is in use. It will be appreciated that for a transmitting entity, the contexts contained in the lookup table may "terminate" at different peer receiving entities, whilst for a receiving entity, the contexts contained in the lookup table may originate at different transmitting entities.

An additional field is added to the lookup table at the receiving entity. This field contains a flag which indicates whether or not a context channel corresponds to a first TDM channel (allocated to that context). The host control processor sets the first channel flags. When creating a new context containing several channels, the processor will search through the table to locate the first channel in the table for the context and set the first channel flag bit for this channel. When the processor is adding a channel to an existing context, the processor will compare the location of the new channel with that of the existing first channel and move the flag if the new channel precedes the current first channel. Similarly, if a channel is removed from an existing context, and the removed channel is the current first channel, the first channel flag will be reallocated.

The modified table vis-à-vis FIG. 3 is illustrated in FIG. 4, from which it will be seen that the flag is set for channel number 0/stream 0 (context 1), channel number 0/stream 2 (context 2), and channel number 3/stream number 0 (context 4). (As all of the channels of context 3 are inactive, no first channel flag is set for context 3.)

Figure 2:
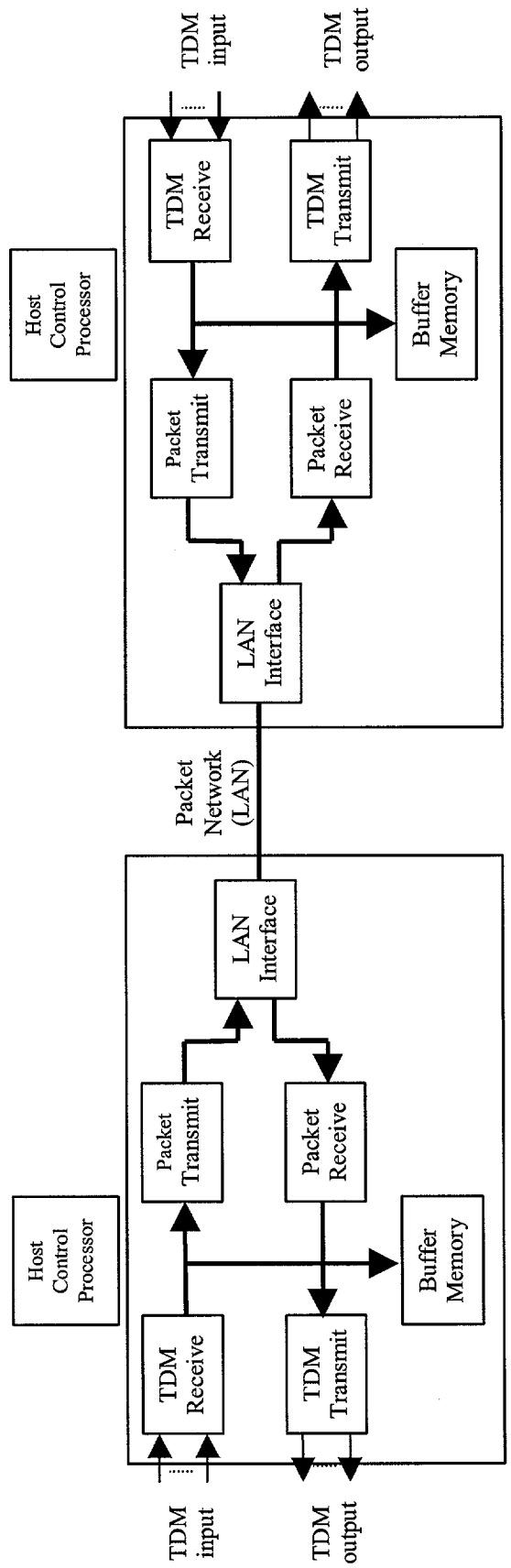
FIG. 2 illustrates in more detail TDM-packet conversion units of the system of FIG. 1.

With reference to FIG. 2, the user data contained within packets arriving at a receiving entity from the packet network is stored in a buffer memory. One buffer is provided for each context (the buffers may be real or virtual, i.e. formed logically from a single block of memory). The TDM transmit entity accesses the lookup table using the channel number and stream number of the next channel which is to be transmitted. The context associated with the channel and stream numbers is returned, together with the valid channel and first channel flags.

When the first packet arrives for a given context, the TDM transmit entity will already be cycling through the lookup table. If the first entry in the table it encounters following the arrival of the first packet is the first entry for a particular context (the first channel flag is set to Y), and if the status of the valid channel flag is Y, then the TDM transmit entity will proceed to extract the next byte from the context buffer, and will transmit this on the relevant channel number and slot number. However, if for the first encountered entry the first channel flag is set to N, the transmit block must ignore the entry and continue cycling through the lookup table (sending other context data where required) until an entry for the context is reached which has the first channel flag set to Y. At this stage, a byte will be extracted from the context buffer and transmitted on the TDM link. For the remainder of the current packet, and as long as the valid channel flag for the context remains set to Y, each time an entry in the table is reached for this context, a byte will be extracted from the context buffer and transmitted.

If it is the case that for the first entry in the table for a particular context, the status of the valid channel flag is Y but the first channel flag is set to N, the transmit entity will determine that the context data is not aligned with the TDM frame. The transmit entity will therefore skip the remaining entries for that context in the table, and resynchronise to the correct first channel table entry on the next cycle. Similarly, if the transmit entity encounters a second entry for a given context having the first channel flag set in a single cycle, the entity will ignore subsequent entries in the table for the context and will resynchronise on the next cycle.

Whilst the embodiment described above has been concerned with a TDM transmit entity, it will be appreciated that the invention applies equally to a TDM receive unit at which data is mapped from TDM frames into contexts for transmission over the packet network.

It will be appreciated by the person of skill in the art that various modifications may be made to the embodiment described above without departing from the scope of the present invention. For example, the invention will allow a system to recover from the loss of packets in a data network, or the receipt of a packet having an incorrect length, as well as from the updating of the lookup tables(s). The invention is applicable to systems with any number of channels and streams including single stream/multiple channel systems and multiple stream/single channel systems. The TDM-packet conversion units may be implemented in software rather than hardware, or by a combination of hardware and software.

The invention claimed is:

1. A method of mapping between contexts of a packet network and TDM channels and streams, the method comprising:

constructing a lookup table defining the sequence in which data is to be mapped between contexts and TDM channels and streams, and including for each row of the table a flag which indicates whether or not that entry is the first entry in the table for the corresponding context; and cycling through the lookup table and making use of said flags to synchronise the start of each packet with the first entry of a TDM frame for each context.

2. A method according to claim 1, wherein each row of the lookup table contains a context number, a valid channel flag, and a first channel flag, which correspond to the addressing channel and stream.

3. Apparatus for mapping between contexts of a packet network and TDM channels, the method comprising:

a memory;

first processing means for creating and maintaining a lookup table in the memory, the lookup table defining the sequence in which data is to be mapped between contexts and TDM channels, and including for each row of the table a flag which indicates whether or not data carried by a given context is to be mapped to a first allocated channel of a TDM frame or vice versa; and second processing means for cycling through the lookup table and for making use of said flags to synchronise the start of each packet with the first entry of a TDM frame for each context.

* * * * *